(No Model.)  3 Sheets—Sheet 1.

W. H. DOLMETSCH.
MECHANICAL MOVEMENT.

No. 544,613.  Patented Aug. 13, 1895.

WITNESSES
William F. Greenslade
J. A. Burrows

INVENTOR
W. H. Dolmetsch
B. F. Eibler
Attorney (No Model.) 3 Sheets—Sheet 2.

W. H. DOLMETSCH.
MECHANICAL MOVEMENT.

No. 544,613. Patented Aug. 13, 1895.

WITNESSES
William F. Greenslade
J. A. Burrows

INVENTOR
W. H. Dolmetsch
BY B. F. Eibler
Atty

UNITED STATES PATENT OFFICE.

WILLIAM H. DOLMETSCH, OF ELMIRA, NEW YORK.

MECHANICAL MOVEMENT.

SPECIFICATION forming part of Letters Patent No. 544,613, dated August 13, 1895.

Application filed September 9, 1893. Serial No. 485,148. (No model.)

*To all whom it may concern:*

Be it known that I, WILLIAM H. DOLMETSCH, a citizen of the United States, residing at Elmira, in the county of Chemung and State of New York, have invented a new and useful Mechanical Movement for Converting Reciprocating Motion into Rotary Motion; and I hereby declare that the following is a full, true, and exact description thereof.

My invention relates to an improvement in mechanical movements; and it consists in a continuously-revolving wheel having an uneven number of single teeth or groups of teeth upon its edge, combined with a reciprocating frame or rack, inside of which the wheel revolves, and which has formed in its opposite inner edges a recess or recesses to receive the tooth or teeth, the number of recesses in each edge corresponding to the number of teeth placed singly or in groups on the edge of the wheels, as will be more fully described hereinafter.

The object of my invention is to produce a mechanical movement for converting continuously rotary to reciprocating movement or reciprocating to rotary movement, as may be desired.

Figure 1:
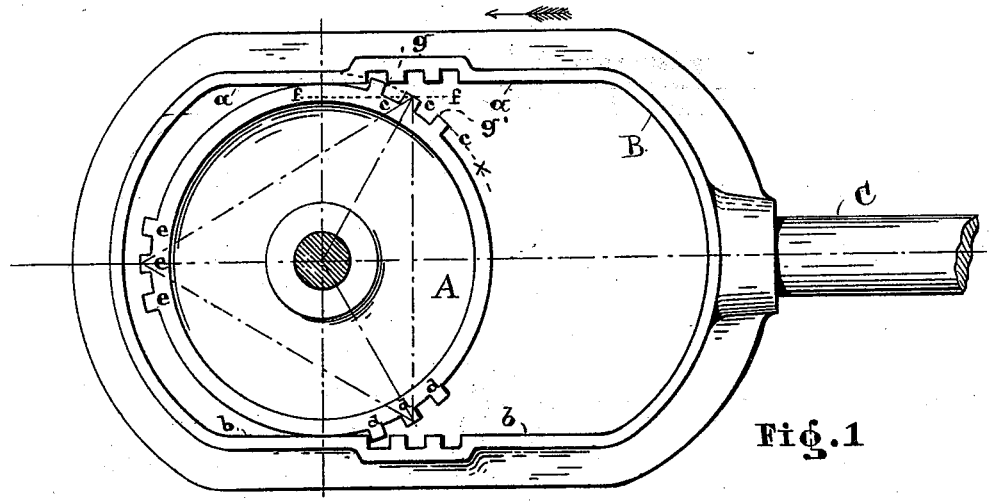
Figure 2:
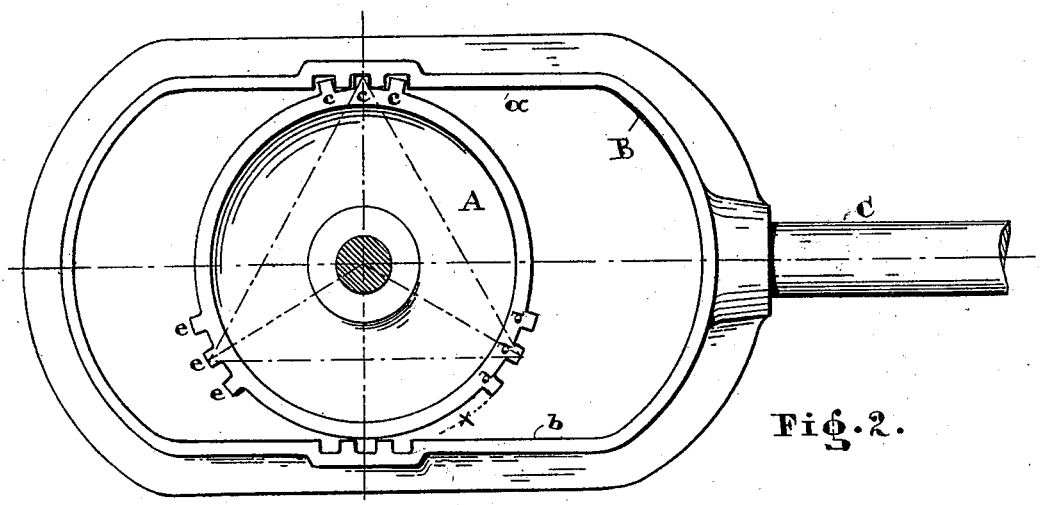
Figure 3:
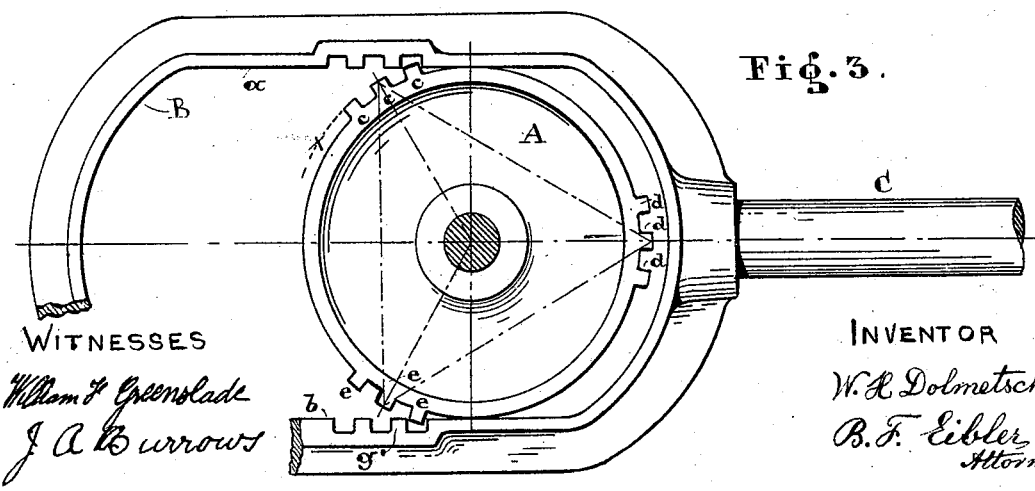
Figure 4:
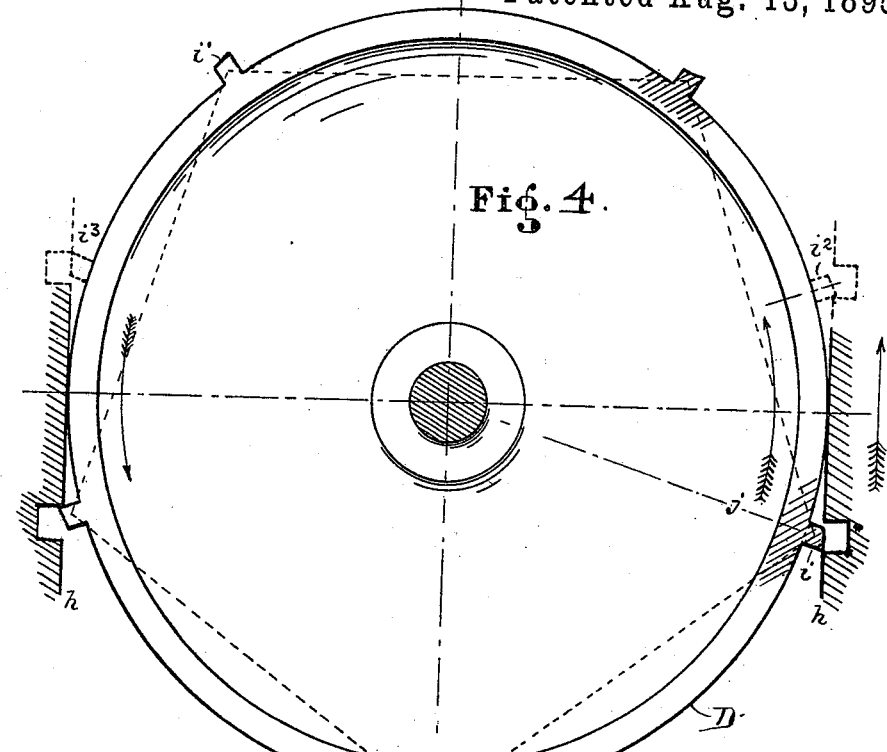
Figure 5:
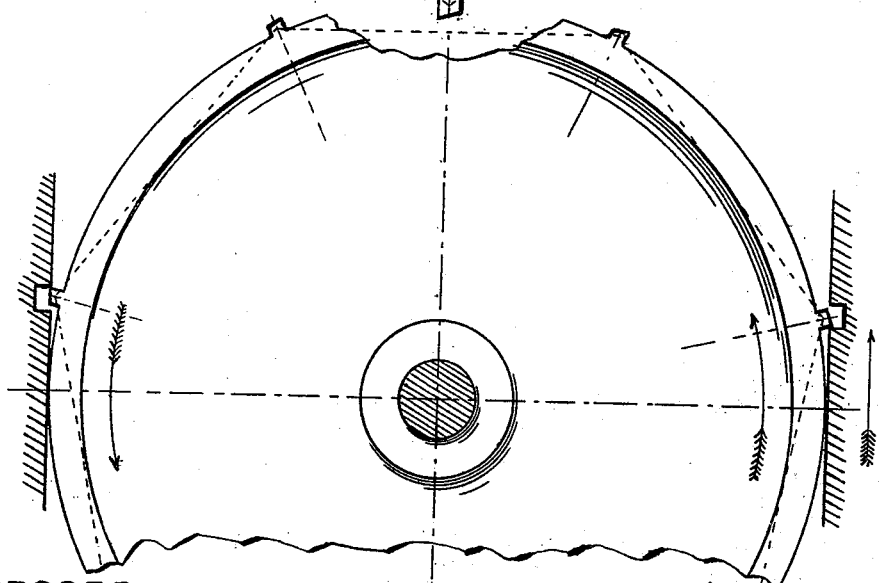
Figure 6:
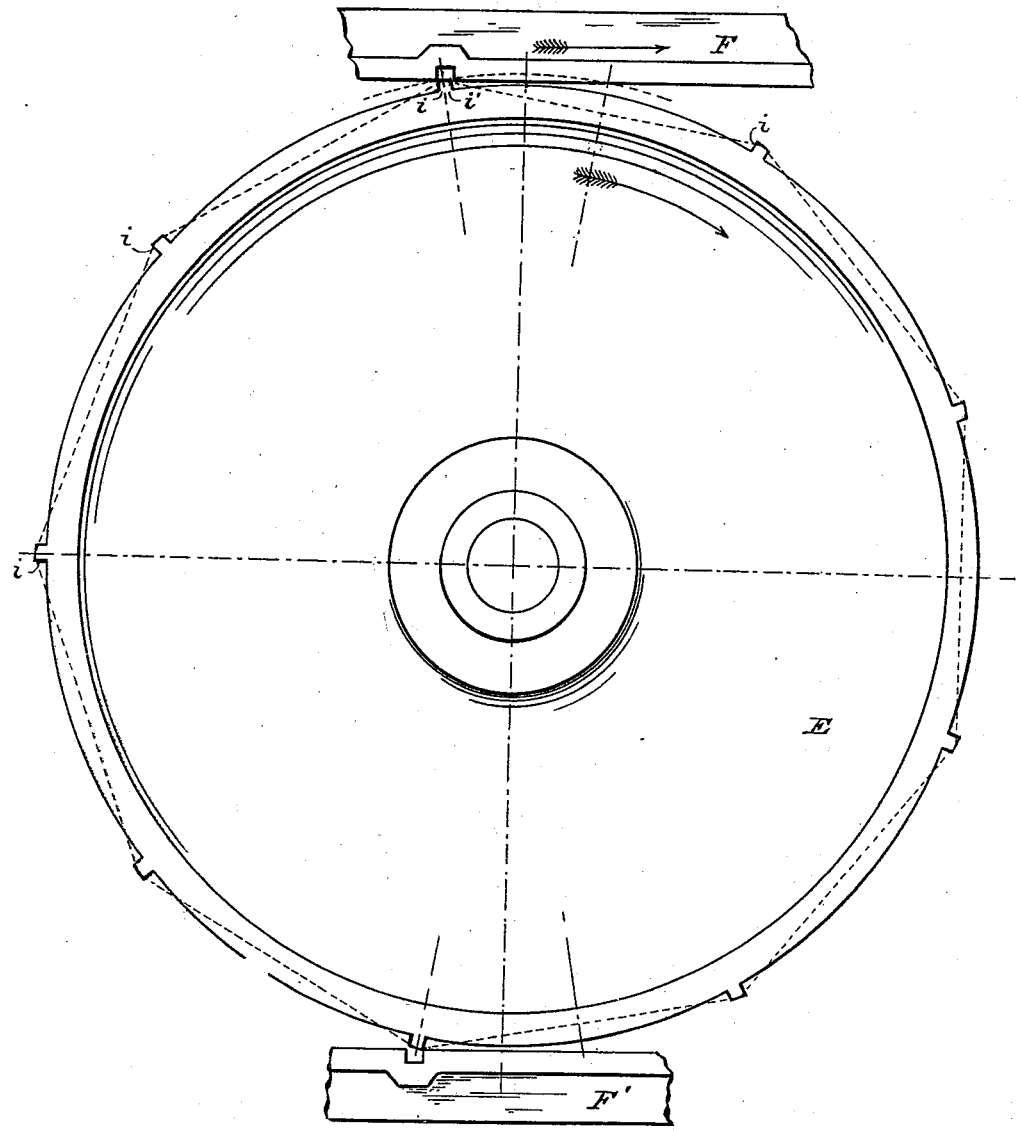

Figures 1, 2, and 3 show side elevations of a mechanical movement embodying my invention, three groups of teeth being shown and the parts being shown in different positions. Figs. 4, 5, and 6 also show similar views of the same movement, uneven numbers of single teeth being shown instead of groups.

A represents a continuously-revolving wheel provided with an uneven number of groups of teeth, or teeth arranged singly upon its edge, as may be desired. This wheel revolves inside of the reciprocating rack or frame B, which has a recess or recesses formed in its inside opposite edges, according as a group or a number of single teeth are used on the edge of the wheel. Whether a group of teeth or a number of single teeth are used the number of the groups and the number of the single teeth used must be of an uneven number, and they are so arranged that as the last tooth of one group, or one single tooth, is leaving a recess the first tooth of the next group, or the next succeeding single tooth, is just about to enter the recess in the opposite side of the rack and reverse its motion, while the wheel continuously revolves in the same direction.

The driving-power may be applied to either the wheel or the rack, as may be desired. If the wheel is used to drive the rack the rack will be reciprocated just twice the number of times there are groups of teeth, or teeth arranged singly on the edge of the wheel, to one revolution of the wheel, and if the rack is used to drive the wheel the same ratio of reciprocations to one revolution is maintained.

Having thus described my invention, I claim—

In a mechanical movement for converting motion, a continuously revolving wheel provided with an uneven number of groups of teeth, each group consisting of one or more teeth, said groups being arranged symmetrically on the wheel and equi-distant from each other, combined with a yoke inside of which the wheel revolves, and which is provided with tooth recesses on each of its inner edges opposite each other, and corresponding in number and pitch to the number and pitch of the teeth in each of the aforesaid groups, said parts being so located with respect to each other that just as a tooth on the wheel is entering a recess on one side of the rack, another tooth is leaving the recess on the opposite side, substantially as shown.

In testimony whereof I hereunto set my hand and seal in presence of two witnesses.

WILLIAM H. DOLMETSCH. [L. S.]

Witnesses:
  WALTER A. BIDDLE,
  B. F. EIBLER.